March 24, 1964     J. KAPER     3,126,113
HARVESTING MACHINE
Filed May 4, 1961
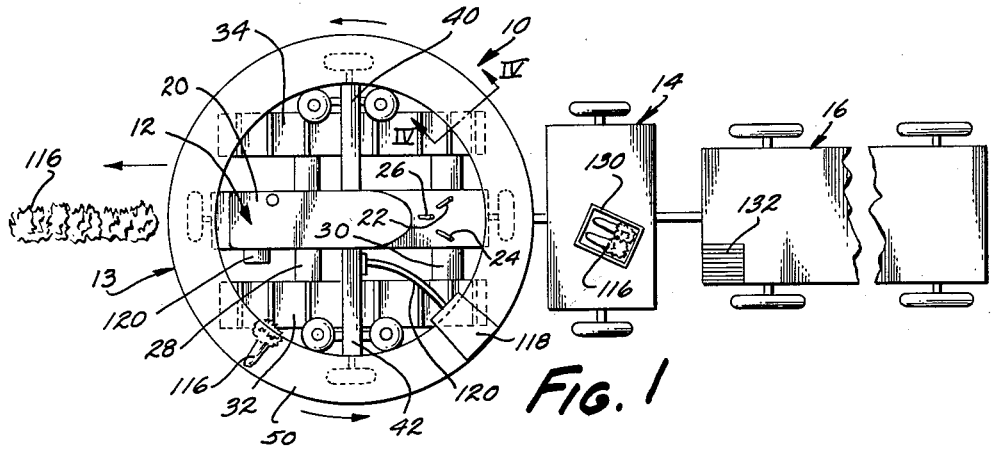
FIG. 1
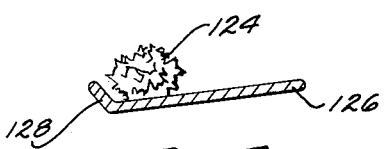
FIG. 5
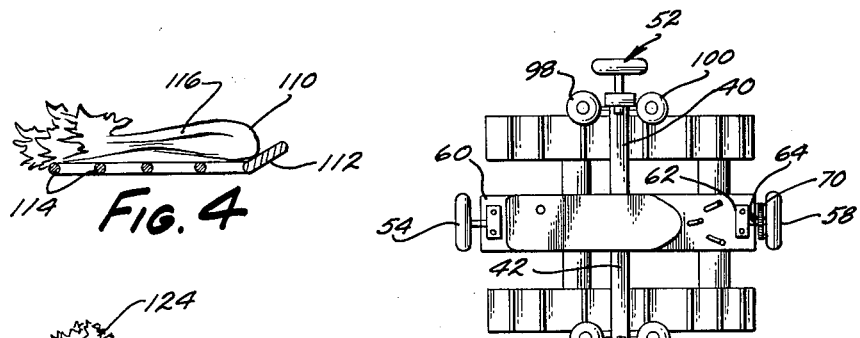
FIG. 4
FIG. 2
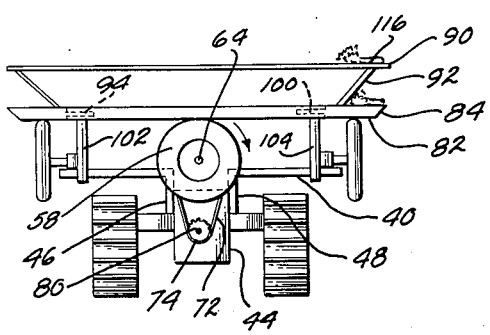
FIG. 3
INVENTOR.
JOHN KAPER
BY
ATTORNEYS

United States Patent Office 3,126,113
Patented Mar. 24, 1964

3,126,113
HARVESTING MACHINE
John Kaper, Rte. 1, Hamilton, Mich.
Filed May 4, 1961, Ser. No. 107,859
1 Claim. (Cl. 214—519)

This invention relates to crop harvesting equipment, and more particularly to a mobile harvesting machine which moves down rows of crops and enables all crop-harvesting steps to be simultaneously and efficiently conducted on and adjacent the machine.

In the harvesting of relatively fragile crops e.g. celery or head lettuce, the several processes such as cutting, trimming, washing, and packing are largely hand operations because such plants damage so easily and because the trimming and grading of the plants must be carefully and accurately performed, among other things. Conventional harvesting methods are largely controlled by the equipment available and generally include the following operations. First, the individual plants are cut and placed one-by-one in a container for hauling to a central shed by a trailer pulled behind a tractor. At the shed, the containers are removed from the trailer and the plants taken from the carriers and placed on one or more long linear conveyors. These preliminary steps involve a great deal of time and labor as it will be readily noted. Trimming, washing, grading and packing is then performed by individuals positioned adjacent the linear conveyors. These latter steps regularly necessitate an excess of labor since the plants move along the conveyor in spurts as trailer loads are brought in. Further, the various grades of plants which must all be removed and graded on their one trip along the conveyor, tend to be present in a majority of one grade, and this grade varies with the trailer load depending on the fertility of the sector of the field from which the plants came. Thus, the persons handling a particular grade at one position along the conveyor are greatly rushed until the plants start crowding another person and then the first person has little to do. After the plants are all trimmed, the waste trimmings must be gathered up, moved out of the shed and placed in piles. They then must be hauled away load-by-load. These steps require additional time and labor.

Accordingly, it is an object of this invention to provide a harvesting machine which abrogates several time and labor wasting steps involved with the use of conventional equipment.

It is another object of this invention to provide a harvesting machine which enables the crops to be harvested in a continuous and efficient manner wherein the crop elements are placed directly on the machine at the location where the crop is first gathered, are continuously conveyed by the machine in a closed conveyor circuit to allow careful steady trimming, are washed as it is conveyed, and are continuously removed from the conveyor circuit for packing adjacent the machine so that the entire process is quickly accomplished right at the location of the plants. With the inventive apparatus, all waste is left scattered throughout the fields where it serves as fertilizer, and requires no cleaning up or hauling whatever. The inventive machine is capable of moving directly up rows of delicate crops to allow their efficient harvest without any possible damage occurring to the individual plants. The closed circuit, constant-recirculating, transporting means enables the crops to be graded very accurately and at a proper pace depending on the nature of the plants. More specifically, the plants are not deflected from the conveyor after traveling one, or less than one, revolution of the circular conveyor, but rather are continuously circulated and appear before the workers again and again until all are properly processed. The apparatus also allows the plants to be handled less than normal, thus diminishing the frequency of damage thereto.

It is another object of this invention to provide a machine of the type described which actually is a simple and inexpensive addition to conventional tractors already used on every farm, thus making the harvesting machine very economical.

Many other objects and advantages of the inventive apparatus will be apparent from a study of the following specification in conjunction with the drawings, in which:

FIG. 1 is a plan view of the harvesting machine straddling a crop row and having connected thereto a packing trailer and a hauling trailer;

FIG. 2 is a plan view of the harvesting machine with the rotatable crop-transporting tray means removed;

FIG. 3 is a rear elevation view of the novel harvesting machine;

FIG. 4 is a cross-sectional view taken on plane IV—IV of FIG. 1 and showing a tray; and FIG. 5 is a sectional view of a modified form of the tray disclosed in FIG. 4.

Basically, the invention comprises a harvesting machine which utilizes a conventional tractor in combination with a continuous rotating crop-transporting tray means supported above the tractor by support means. The tray means protrudes ahead of the tractor to allow harvested crop elements to be placed thereon without the tractor running over them. The elements are transported around and around for continuous finishing operations and removal. The tray preferably protrudes beyond both sides of the tractor to allow these intermediate finishing operations such as trimming to be easily performed. It also protrudes to the rear of the tractor to allow simple removal for packing. The vertical support means for the tray means preferably comprises a plurality of wheel-type vertically rotatable members. Also, lateral guide means are provided for the tray means and preferably comprise a set of horizontally rotatable idler wheels. The continuous driving means for the tray means preferably comprises one of the vertically rotatable supports which is driven from a conventional power take-off on the tractor.

Referring now to FIG. 1, the harvesting machine 10 includes a conventional tractor 12, and a closed circuit conveyor means 13. It is shown towing a packing trailer 14 and a hauling trailer 16.

Tractor 12 is depicted as a track-type tractor with the engine 20 in the front end thereof, conventional directional controls (usually brakes) 22 and 24, a conventional gear shift 26, front axle 28, rear axle 30, and creeper tracks 32 and 34 to propel the tractor in the direction indicated by the arrow. It will be obvious from reading the following description that any type of tractor may be utilized in the place of the caterpillar-type shown. Therefore, the term tractor as hereinafter used is intended to encompass all such self-propelling vehicles that may be utilized in the field whether they be of the wheeled or the track type.

A pair of laterally extending beams 40 and 42 are mounted by downwardly extending flanges 46 and 48 to the body 44 (FIG. 3) of tractor 12 by suitable means (not shown). Positioned generally above tractor 12 and protruding in front thereof, and preferably behind and on both sides thereof, is an annular crop-transporting tray means 50 which is supported by four wheel-type vertically-rotatable support members 52, 54, 56 and 58 variously positioned around the tractor. Supports 52 and 56 are secured to the ends of lateral beam support means 40 and 42. Support 54 in front of tractor 12 is rotatably secured to the front 60 of the tractor frame, and support 58 is secured at the rear of tractor 12 adjacent the rear axle. Suitable pillow blocks 62 or the like may be used to anchor the support wheels.

Mounted on the axle 64 of the rear support 58 is a gear 70 connected by chain 72 to gear 74 mounted on conventional power take-off shaft 80 extending from the rear of tractor 12. Obviously, the gear and chain combination may be replaced by a suitable belt drive combination, or other equivalent drive arrangements.

In the form of the invention illustrated, tray means 50 is driven by the frictional contact of rear wheel 58 with lower surface 82 of lower tray 84 shown in the dual tray assembly in FIG. 3. This frictional drive may be replaced by other equivalent types such as a gear and circular rack. Further, if desired, independent power means may be utilized to drive the tray means rather than the power take-off device.

In the illustrated embodiment of the invention, tray means 50 is composed of two annular, coextensive trays 84 and 90 spaced vertically by braces 92 positioned so as not to interfere with the functioning of the lower tray. Any number of trays may be used. The tray means is held laterally positioned above the tractor and on the vertical support wheels by a set of four horizontally rotatable idler wheels 94, 96, 98 and 100 which are mounted to vertically extending portions 102 and 104 attached to beams 40 and 42. These idler wheels contact the inner peripheral surface of lower tray 84 as shown in FIG. 3.

The particular structure of the individual trays may vary depending upon the crop to be harvested. For example, the tray illustrated in FIG. 4 works admirably for celery. The butt 110 of the celery plant 116 rests on slanted surface 112, while the connected rings 114 support the rest of the celery plant 116. This open-type tray allows the celery to be washed as by a suitable washer 118 extending over the tray and attached by bracket 120 to the lateral beam 42. A pump 120 driven by engine 20 may be utilized to pump water from a reservoir tank (not shown) mounted on the tractor.

The harvesting machine may be used for many other crops. For example, when lettuce 124 (FIG. 5) is harvested, a solid tray 126 having a slanted surface and a retaining flange 128 may be used.

*Operation*

The operation of the machine will be explained as used in its preferred application in the harvesting of celery. When it is desired to harvest the crop, the tray means 50 is placed upon the four vertical support wheels in contact with the horizontal guide wheels. Next, suitable equipment is attached behind the tractor such as packing trailer 14 and hauling trailer 16 to pack or crate the celery, and haul it. After the tractor is started, it is steered astraddle a row or rows of the celery and allowed to move very slowly down the row with the circular or annular tray means being simultaneously slowly rotated. As is well-known, the tractor will generally stay astraddle the crop rows merely by an occasional adjustment of the controls. In the drawings only one row of the crop is shown. However, it should be realized that the tractor will conveniently straddle two or three rows, with other adjacent rows being accessible also. Therefore in one pass up to about six rows may be easily handled with the machine. The central opening in the annular trays enables a worker standing on the packing trailer or walking beside the tractor to reach over the tray and adjust the controls as needed. As the tractor proceeds down the row, a worker walking ahead of the tractor may cut the celery plants. Alternatively, the celery may be cut and topped by a conventional cutter on a mobile unit (not shown) preceding the harvesting machine. Another worker directly picks up several of the cut celery plants at a time and places them on the bottom tray 84. The plants are then continuously rotated on the tray so that trimmers walking along the side may trim the plants one-by-one of defective stalks. The trimmers then place the plants on the upper tray 90 to again continuously revolve and pass underneath washer 118. Packers standing on trailer 14 pick the trimmed and washed plants off and place them in suitable crates 130. After being packed, the crates are placed on the hauling trailer as at 132 for transport. The trimmers and packers are able to perform their functions very carefully and very efficiently because of the closed cycle conveyance of the plants. I.e., if they do not have time to remove all of the plants the first time around, the plants will return again and again to enable careful trimming and accurate grading. This harvesting machine makes the entire operation continuous, streamlined, and localized.

When harvesting soup celery, or head lettuce, ordinarily only one tray will be needed. Obviously the number of trays used with any individual crop will vary with the operations to be performed thereon.

Various other obvious modifications may be made in the harvesting machine as illustrated, including the type of tractor used, the type of support arrangement used in place of the lateral beams, the type of vertical support members, the particular drive means, the particular structure of the lateral guide means, the tray structure and others. These obvious modifications are within the spirit of this invention, which is not to be limited by the illustrative material set forth but only by the scope of the appended claim and the equivalent structures thereto.

I claim:

A crop harvesting machine comprising: a self-propelled tractor including power drive means for driving said tractor, control means, and power take-off means; an annular horizontal crop-recirculating tray means supported above and on said tractor; said tray means being composed of an upper crop receiving tray and a lower crop unloading tray for the crop elements after finishing operations are performed thereon, the area above both of said upper and lower trays being free from obstructions causing the crop elements to recirculate on each until removed; said tray means protruding beyond the front of said tractor to allow easy placement of harvested crop elements on said crop receiving tray before any portion of the tractor passes thereover; said tray means protruding beyond the sides of said tractor to allow sorting and finishing operations to be performed on the crop elements as they are recirculated; said tray means protruding beyond the rear of said tractor to allow easy and rapid removal of the recirculating crop elements from said crop unloading tray; vertically rotatable wheel support means mounted on horizontal axles attached to and extending out from said tractor and positioned at the front of, at the back of, and on both sides of said tractor to vertically support said tray means and allow it to freely rotate; a plurality of horizontally rotatable wheel-type guide members on vertical axles mounted to said tractor and engaging the periphery of said annular tray means for laterally positioning said tray means with respect to said tractor; and the vertically rotatable wheel support means at the back of said tractor being operatively connected to said power take-off means to continuously rotate said tray means.

References Cited in the file of this patent

UNITED STATES PATENTS

| | | |
|---|---|---|
| 1,854,850 | Linkenauger | Apr. 19, 1932 |
| 2,315,013 | Pecker et al. | Mar. 30, 1943 |
| 2,529,023 | Helms | Nov. 7, 1950 |
| 2,705,474 | Siciliano | Apr. 5, 1955 |
| 2,853,190 | Hawkins | Sept. 23, 1958 |

FOREIGN PATENTS

| | | |
|---|---|---|
| 92,760 | Norway | Nov. 3, 1958 |